Oct. 23, 1934.                P. E. DODGE                1,978,042
                      CUTTING AND WELDING APPARATUS
                  Filed Feb. 17, 1932      3 Sheets-Sheet 3
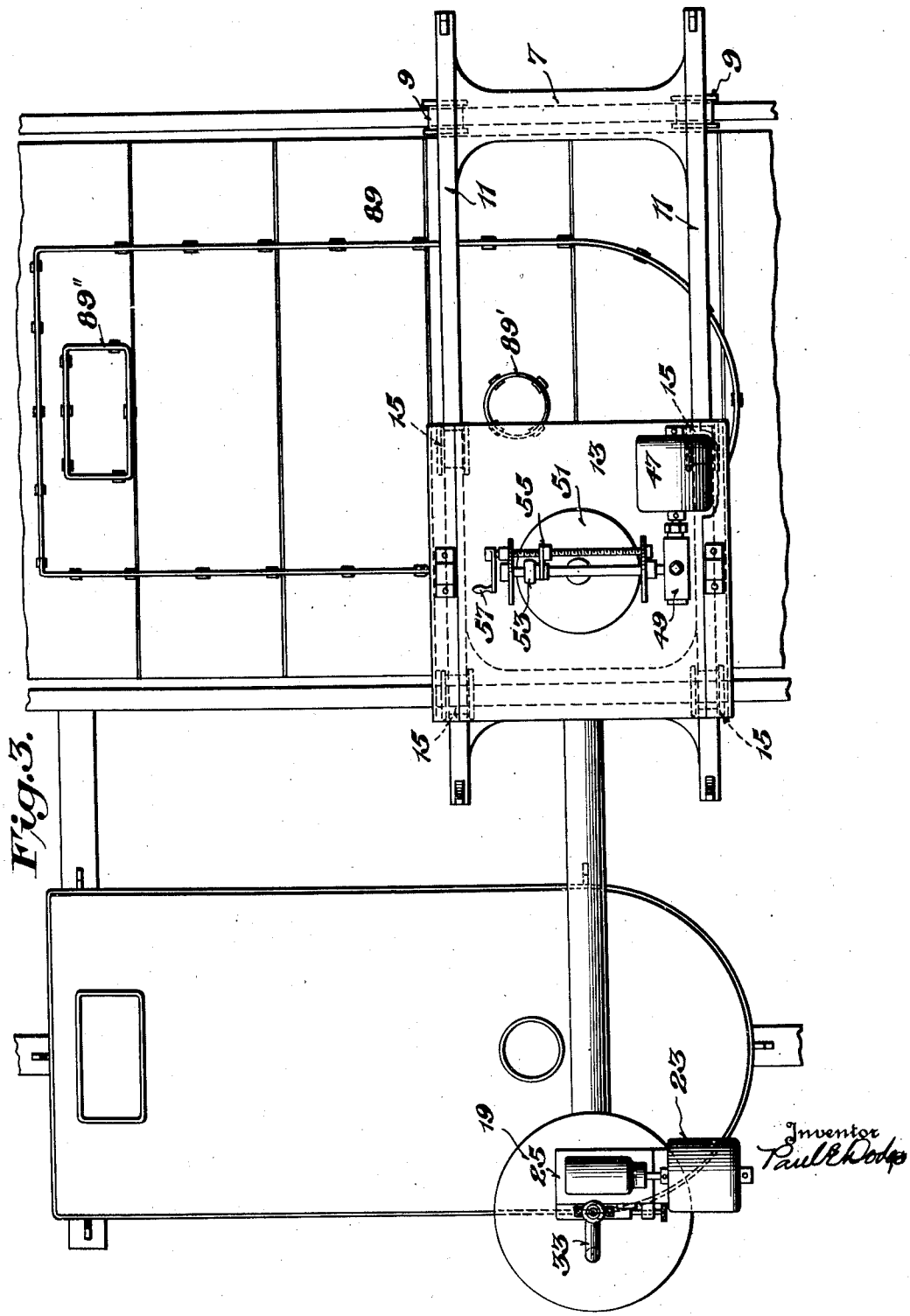

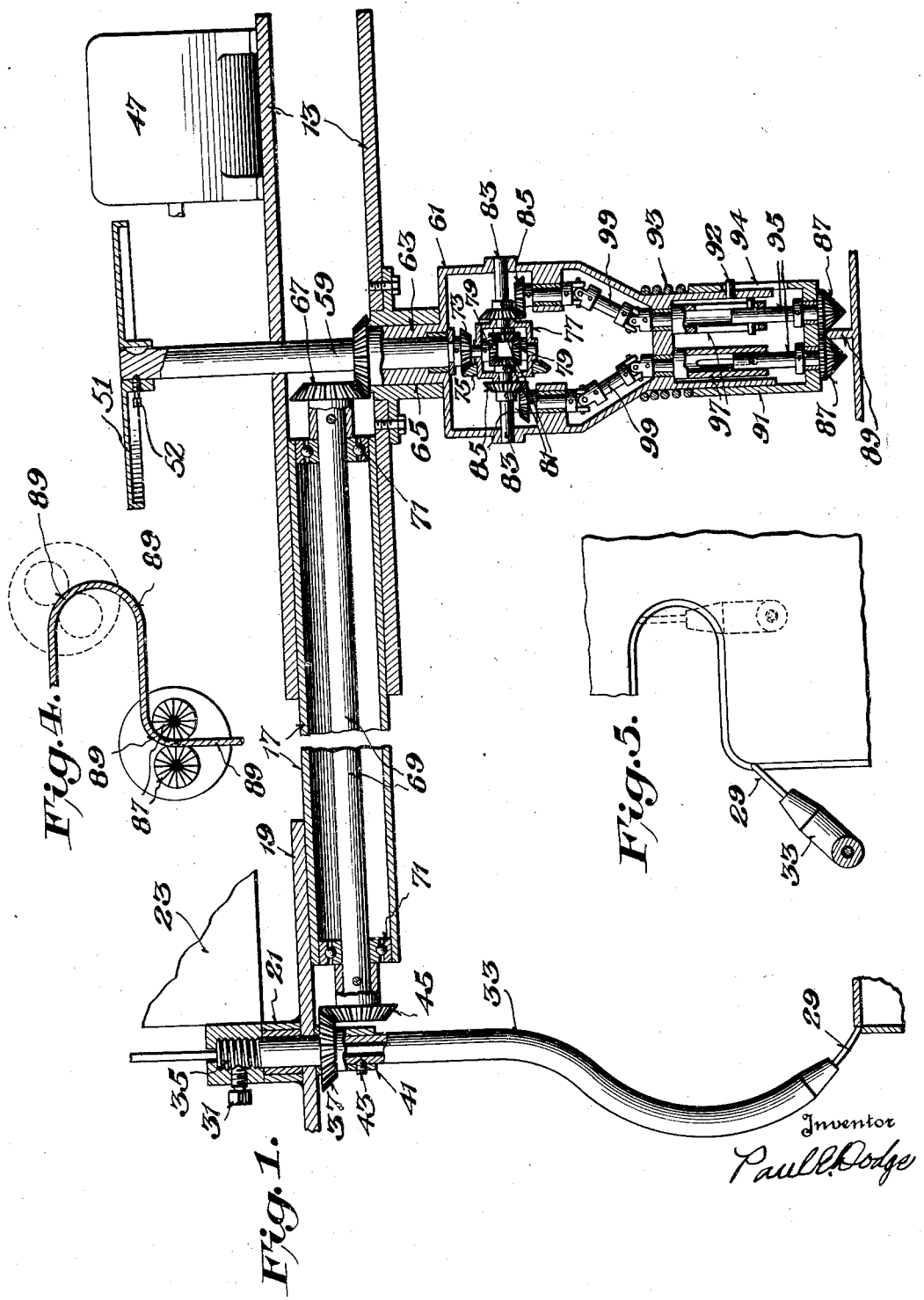

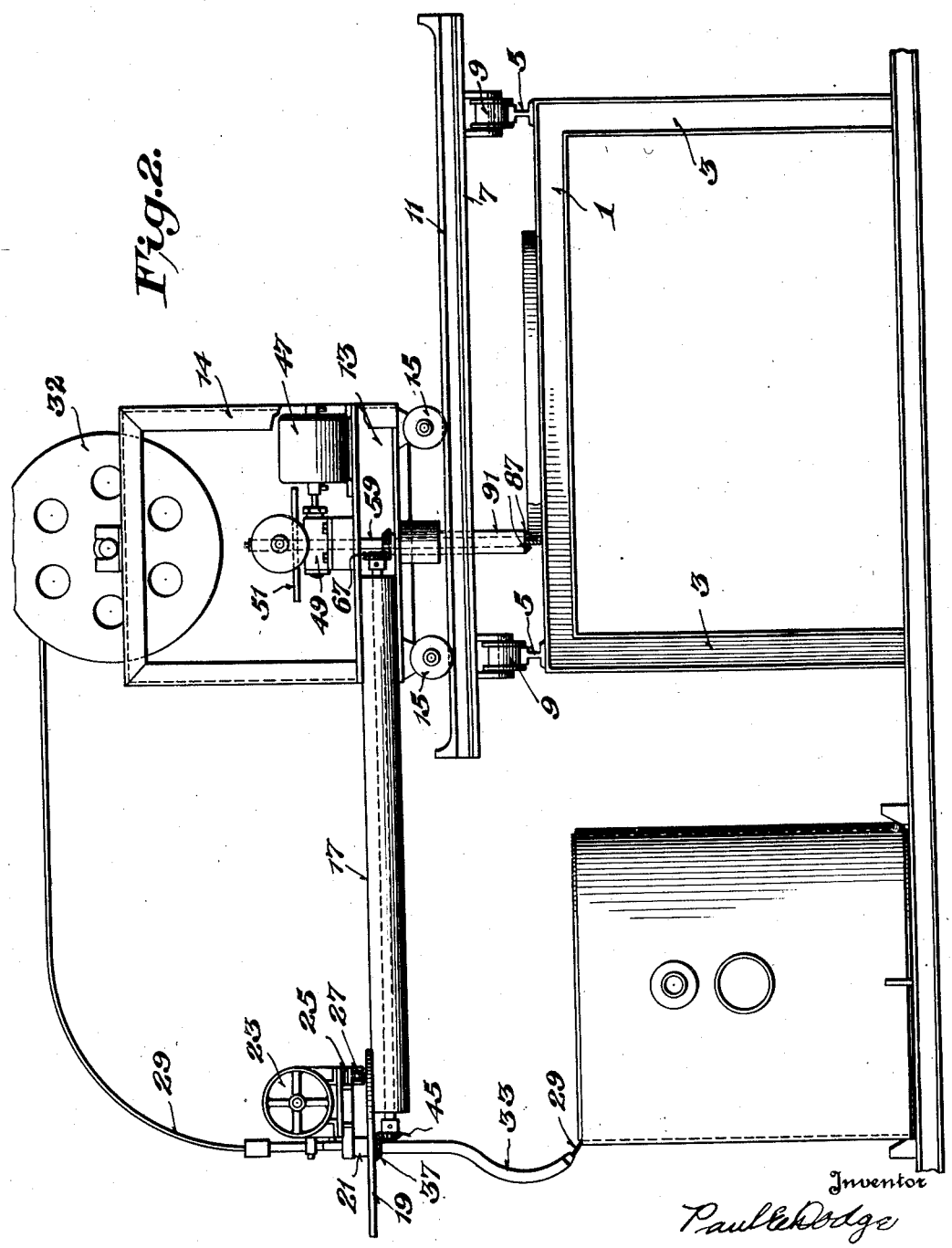

Patented Oct. 23, 1934

1,978,042

UNITED STATES PATENT OFFICE 1,978,042

CUTTING AND WELDING APPARATUS

Paul E. Dodge, Detroit, Mich.

Application February 17, 1932, Serial No. 593,468

9 Claims. (Cl. 266—23)

This invention relates to an apparatus for moving a thermal metal-working instrumentality such as a cutting torch or a welding head, along a predetermined course, and maintaining the line of the cut, or of the feed of the welding wire, at a constant oblique angle to the line of operation of the instrumentality, regardless of the nature of the figure described by its movement. Devices hitherto used for this purpose have maintained the line of the cut, or of the feed of the welding wire, normal to the plane containing the line of operation of the instrumentality, or, if the line of cut or of feed were oblique to the line of operation so long as that were a right line, the instrumentality required to be adjusted by an operator if the line of operation were curved or angular. I have used the term "oblique angle" to denote any direction of the line of cut or of feed other than that normal to the plane containing the line of operation of the instrumentality, as my device is capable of cutting or feeding the welding wire along a line normal to the line of movement of the instrumentality, but lying in the plane of that line and the appended claims are to be construed as covering such an arrangement.

The invention is illustrated in the accompanying drawings, in which

Fig. 1 is a vertical section through a form of my improved means for supporting and guiding a welding electrode, some parts being omitted and others shown in elevation.

Fig. 2 is an end elevation of a machine for cutting or welding, in which my improvements have been incorporated.

Fig. 3 is a partial plan view of the machine of Figure 2, showing a work piece in position for welding under the welding head, and the corresponding template or pattern in place upon the table of the machine.

Fig. 4 is a detail showing the relation of the feed rollers to the template.

Fig. 5 is a detail similar to Figure 4, showing the corresponding relation of the welding wire to the seam to be welded.

It is to be understood that a welding head and electrode are shown on the drawings merely for convenience in illustration, and that the use of a cutting torch, a welding head, or any similar thermal metal-working instrumentality is within the scope of my invention.

My improvements are shown as incorporated in a machine of an ordinary type, having a table, 1, carried by supports, 3. Rails, 5, are attached to this table, on which a sub-carriage, 7, rolls lengthwise of the table on wheels indicated by 9. On rails, 11, on this sub-carriage travels a main carriage, 13, mounted on wheel, 15. The movement of the carriage, 13, on the rails, 11, is transverse to the length of the table, 1, so that any point on the table can be reached by movements of the carriage and sub-carriage.

To the carriage, 13, is attached a bracket arm, 17, here shown as tubular. To the outer end of the bracket is attached a circular base plate, 19, and to the center of this base plate is secured a sleeve, 21. The base plate, 25, of a welding head, 23, is supported on this sleeve and on rollers, 27, rolling on the base plate, 19, so that the head can swing to any position about the center of the base plate 19. Such welding heads are now articles of manufacture and will not be described in detail here, as the details of the head form no part of my invention. By the operation of the head, 23, the electrode wire, 29, is fed from a reel, 32, supported on the carriage, 13, by a frame, 14.

The welding head, 23, includes an electrode guide, 33, which is secured to the base, 25, of the head by any suitable means, here shown as a screw joint, 35, and a set screw, 31. Just below the base plate, 19, is a miter gear, 37, having a long hub, 41, through which the electrode guide, 33, passes, the hub, 41, being secured to the guide by any suitable means, here shown as a set screw, 43. This miter gear, 37, and its companion gear, 45, form parts of the mechanism by which the line of feed of the electrode is maintained at a constant oblique angle to the line of the weld.

Mounted on the base of the carriage, 13, is an electric motor, 47, which operates a speed-changing gear, comprising a disk, 51, and a roller, 53, by means of a speed-reducing gear, 49. A screw-and-nut mechanism, 55, operated by a hand-crank, 57, serves to change the speed of the disk, 51, by moving the roller, 53, across the disk, but the details of the speed-changing gear will not be described further as they form no part of my invention, such speed-changing gears being in common use.

The disk, 51, is secured to a shaft, 59, which shaft passes through a suitable bearing in the upper plate of the carriage 13, and into the housing, 61, of the gearing by which the carriage is caused to follow the template (such gearing and template being hereinafter described in detail) by any suitable means, here shown as a set screw, 52. The top plate of the gear housing, 61, has a hub, 63, which can rotate in a bearing, 65, secured to the lower plate of the carriage, 13. To this hub, 63, is attached one of a pair of miter gears, 67, the other gear of the pair being secured to the inner end of a shaft, 69, supported in the bracket arm, 17, by suitable bearings, 71. To the outer end of this shaft 69, the miter gear, 45, heretofore described, is attached, and it will be apparent that any rotation of the housing, 61, will result in an equal rotation of the electrode guide, 33.

The means by which the housing, 61, is rotated, will now be described. To the lower end of the shaft, 59, is attached a pinion, 73, which meshes with a ring gear, 75, mounted on the casing, 77, of a differential gearing. The spider pinions, 79, of this differential gearing turn in bearings in the casing 77, and mesh with the side gears, 81, which gears are secured to shafts, 83, said shafts having bearings in the casing, 77, and the housing, 61. On each of the shafts, 83, is secured one gear of a pair of miter gears, 85, there being two sets of these miter gears. The other gear of each set of miter gears, 85, is connected, by any suitable means, to one of two feed rollers, 87, which rollers engage respectively one edge of a template, 89, 89', 89", secured, by any appropriate means, to the table, 1, of the machine. As here shown, the rollers, 87, are journalled in a cup member, 91, which telescopes over the lower open end of the housing, 61, being held against rotation by a pin, 92, working in a slot, 94, and is pressed downwardly by a spring, 93, to hold the feed rollers against the template, 89, with sufficient pressure to ensure proper feeding, the rollers being here shown as serrated to give a more positive engagement with the template, 89. The shanks, 95, of the rollers, 87, engage, by means of slip joints, 97, jointed shafts, 99, which are suitably journalled in the housing, 61, and to the upper ends of which are secured the second gears of the sets of miter gears, 85.

From this construction, it results that the rotation of the motor, 47, through the train of gearing described, causes the feed rollers, 87, to rotate in opposite directions against the opposite edges of the template, 89; this movement of the rollers causing the carriage to follow the line of the template, the carriage carrying with it the welding head. When the rollers traverse a curve or angle in the template, the movement of the roller on the inside of the curve or angle will be retarded and that of the roller on the outside will be accelerated equally by the action of the differential gearing, the action of the differential gearing being accompanied by a rotation of the housing, 61. The rotation of the housing, 61, is communicated through the miter gears, 67 and 37—45, to the electrode guide, 33, causing the latter to swing around the curve or angle of the seam in the same manner that the feed rollers swing around the template. It will be seen that the feed rollers, 87, engage the template at two separated points and that, as the rollers travel along the template, the separation of these points produces what may be called a lever effect and causes a rotation of the housing, 61, of the feed mechanism, which rotation is communicated, through the miter gears, 67 and 37—45, to the electrode guide, 33.

The operation of the machine as a whole will be clear from the foregoing description of its construction. To weld a seam which forms a closed figure, a template of the proper form is made, say from a small T- or L-iron, and secured to the table of the machine. The feed rollers, 87, are lowered onto the upright edge of the template and a work piece is so mounted alongside the machine that the electrode engages the point of the work corresponding to the point of the template engaged by the rollers. On closing the switch of the machine, the rollers travel around the template and the electrode travels around the work-piece, until the seam is completed. If it is desired to cut an article having a bevelled or chamfered edge from a plate or slab, the welding head will be replaced by a cutting torch, the flame of which is directed at the desired angle of bevel to the plane of the plate or slab, which angle will be maintained constant by my device as the torch is guided around the curves and angles of the template.

Having thus described my invention, what I claim is:—

1. In a device of the character described, the combination of a thermal metal-working instrumentality; template means for defining a line of operation for said instrumentality and means directed by said template for moving said instrumentality, including means for maintaining the line of action of said instrumentality at a constant oblique angle to said line of operation.

2. In a device of the character described, the combination of a thermal metal-working instrumentality; substantially linear template means for defining a line of operation for said instrumentality and means engaging said template means at two separated points for moving said instrumentality and maintaining the line of action of said instrumentality at a constant oblique angle to said line of operation.

3. In a device of the character described, the combination of a thermal metal-working instrumentality; substantially linear template means having opposite edges for defining a line of operation for said instrumentality and means engaging the opposite edges of said template means for moving said instrumentality and maintaining the line of action of said instrumentality at a constant oblique angle to said line of operation.

4. In a device of the character described, the combination of a thermal metal-working instrumentality; substantially linear template means having opposite edges for defining a line of operation for said instrumentality; means engaging the opposite edges of said template means for moving said instrumentality and maintaining the line of action of said instrumentality at a constant oblique angle to said line of operation and means for driving said template engaging means including a differential gear.

5. In a device of the character described, the combination of a thermal metal-working instrumentality; substantially linear template means having opposite edges for defining a line of operation for said instrumentality; and means, including feed rollers engaging the opposite edges of said template means, for moving said instrumentality and maintaining the line of action of said instrumentality at a constant oblique angle to said line of operation.

6. In a device of the character described, the combination of a thermal metal-working instrumentality; substantially linear template means having opposite edges for defining a line of operation for said instrumentality; feed rollers engaging the opposite edges of said template means for moving said instrumentality: a rotatable support for said feed rollers and means responsive to movements of said support caused by the reaction of said rollers, for maintaining the line of action of said instrumentality at a constant oblique angle to said line of operation.

7. In a device of the character described, the combination of a thermal metal-working instrumentality; substantially linear template means having opposite edges for defining a line of operation for said instrumentality; feed rollers engaging the opposite edges of said template means for moving said instrumentality; a rotatably supported housing element through which extend shafts carrying said rollers, and means responsive to movements imparted to said housing element by said shafts, for maintaining the line of action of said instrumentality at a constant oblique angle to said line of operation.

8. In a device of the character described, the combination of a thermal metal-working instrumentality; substantially linear template means having opposite edges for defining a line of operation for said instrumentality; feed rollers engaging the opposite edges of said template, means for moving said instrumentality and maintaining the line of action of said instrumentality at a constant oblique angle to said line of operation, and means for driving said feed rollers including a differential gear.

9. In a device of the character described, the combination of a thermal metal-working instrumentality; substantially linear template means having opposite edges for defining a line of operation for said instrumentality; feed rollers engaging said edges for moving said instrumentality; a motor; means connecting said motor and said feed rollers including a differential gear; a rotatable housing in which said feed rollers and the side gears of said differential gearing have bearings, and means to communicate movements of said housing caused by differential movements of said rollers to said instrumentality, to maintain the line of action of said instrumentality at a constant oblique angle to said line of operation.

PAUL E. DODGE.